United States Patent
Bi et al.

(10) Patent No.: US 12,326,521 B2
(45) Date of Patent: Jun. 10, 2025

(54) LIDAR SYSTEM BASED ON SILICON-BASED INTEGRATED MAGNETO-OPTICAL CIRCULATOR

(71) Applicant: University of Electronic Science and Technology of China, Chengdu (CN)

(72) Inventors: Lei Bi, Chengdu (CN); Wei Yan, Chengdu (CN); Shuyuan Liu, Chengdu (CN); Jun Qin, Chengdu (CN); Yan Zhang, Chengdu (CN); Longjiang Deng, Chengdu (CN)

(73) Assignee: UNIVERSITY OF ELECTRONIC SCIENCE AND TECHNOLOGY OF CHINA, Chengdu (CN)

( * ) Notice: Subject to any disclaimer, the term of this patent is extended or adjusted under 35 U.S.C. 154(b) by 1070 days.

(21) Appl. No.: 17/315,246

(22) Filed: May 7, 2021

(65) Prior Publication Data
US 2021/0349191 A1 Nov. 11, 2021

(30) Foreign Application Priority Data
May 8, 2020 (CN) .......................... 202010380891.3

(51) Int. Cl.
*G01S 7/481* (2006.01)
*G01S 17/88* (2006.01)
(Continued)

(52) U.S. Cl.
CPC .......... *G01S 7/4818* (2013.01); *G01S 7/4812* (2013.01); *G01S 17/88* (2013.01); *G02B 6/2746* (2013.01); *G02B 6/29352* (2013.01)

(58) Field of Classification Search
None
See application file for complete search history.

(56) References Cited

U.S. PATENT DOCUMENTS

2013/0170782 A1* 7/2013 Evans .................. G02F 1/2257
 385/3
2019/0235053 A1* 8/2019 Spector .................. G01S 17/10
(Continued)

OTHER PUBLICATIONS

Ryohei Takei and Tetsuyo Mizumoto, "Design and Simulation of Silicon Waveguide Optical Circulator Employing Nonreciprocal Phase Shift", Japanese Journal of Applied Physics, vol. 49, 052203 (Year: 2010).*

*Primary Examiner* — Eric L Bolda
(74) *Attorney, Agent, or Firm* — MATTHIAS SCHOLL P.C.; Matthias Scholl

(57) ABSTRACT

A lidar system, including: a laser, an optical detector, a laser antenna, and a silicon-based integrated magneto-optical circulator. The silicon-based integrated magneto-optical circulator includes a silicon-based integrated Mach-Zehnder interference structure or a silicon-based integrated microring structure, and silicon-based integrated magneto-optical waveguides. The silicon-based integrated magneto-optical circulator further includes an input port, a receiving port, and an emission port. The laser is aligned and coupled to the input port of the silicon-based integrated magneto-optical circulator via an optical fiber, a grating coupler, or an edge coupler. The optical detector is aligned and coupled to the receiving port of the silicon-based integrated magneto-optical circulator via the optical fiber, the grating coupler, or the edge coupler. The laser antenna is aligned and coupled to the emission port of the silicon-based integrated magneto-optical circulator via the optical fiber, the grating coupler, or the edge coupler.

4 Claims, 3 Drawing Sheets

(51) Int. Cl.
*G02B 6/27* (2006.01)
*G02B 6/293* (2006.01)

(56) References Cited

U.S. PATENT DOCUMENTS

2020/0408918 A1\* 12/2020 Kameyama ............. G01S 17/95
2021/0124031 A1\* 4/2021 Sarkissian ............... G01S 17/10

\* cited by examiner

LIDAR SYSTEM BASED ON SILICON-BASED INTEGRATED MAGNETO-OPTICAL CIRCULATOR

CROSS-REFERENCE TO RELATED APPLICATIONS

Pursuant to 35 U.S.C. § 119 and the Paris Convention Treaty, this application claims foreign priority to Chinese Patent Application No. 202010380891.3 filed May 8, 2020, the contents of which, including any intervening amendments thereto, are incorporated herein by reference. Inquiries from the public to applicants or assignees concerning this document or the related applications should be directed to: Matthias Scholl P C., Attn.: Dr. Matthias Scholl Esq., 245 First Street, 18th Floor, Cambridge, MA 02142.

BACKGROUND

The disclosure relates to the field of integrated optics, and more particularly, to a laser system based on silicon-based integrated magneto-optical circulator.

Silicon-based optoelectronic technology has developed rapidly in recent years and attracted attention in the field of lidar and laser detection, due to its superior performance and process compatibility.

In a separate lidar system, the transmitter and receiver usually consists of two independent optical ports for laser emission and detection. There are two significant problems with such a system. First, the laser emission optical path and the laser detection optical path need to be adjusted manually, so that the optical axis of the emitted beam and the axis of the receiving telescope remain coaxial or parallel. If there is an error in the installation and adjustment, it will significantly affect the signal strength of the system, or even make it fail to detect the reflected light. Second, the laser detection optical path usually has a large spatial detection angle range, which causes strong ambient light to enter the photodetector, resulting in a low signal-to-noise ratio of the system in a strong light environment, making it difficult to achieve long-distance detection.

The use of a magneto-optical circulator allows the transmitting and receiving ports of laser detection to share the same antenna aperture. The principle is to employ the optical non-reciprocity of the magneto-optical material to make the reflected light return to the optical detector along a different optical path from the emitted light, thereby avoiding problems such as manual adjustment and low signal-to-noise ratio. However, the discrete optical circulator is large in footprint, high in cost, and difficult to couple with optical elements such as lasers and detectors.

SUMMARY

To develop a miniaturized lidar system to avoid detection errors caused by manual adjustment and low signal-to-noise ratio, the disclosure provides a lidar system. Through the effective coupling from a laser, an optical detector and a laser antenna to the silicon-based integrated magneto-optical circulator, and the non-reciprocal transmission characteristics of the silicon-based integrated magneto-optical circulator, the disclosure achieves a full-duplex laser detection.

The lidar system comprises a laser, an optical detector, a laser antenna, and a silicon-based integrated magneto-optical circulator.

The silicon-based integrated magneto-optical circulator comprises a silicon-based integrated Mach-Zehnder interference structure or a silicon-based integrated micro-ring structure, and silicon-based integrated magneto-optical waveguides. The silicon-based integrated magneto-optical circulator further comprises an input port, a receiving port, and an emission port.

In a class of this embodiment, the silicon-based integrated Mach-Zehnder interference structure comprises two interference arms which are used in combination with a 180° curved waveguides to steer the light to the opposite directions. The silicon-based integrated magneto-optical waveguides are disposed respectively in the forward and backward transmission directions of the two interference arms, so that the light in the silicon-based integrated magneto-optical waveguide of one of the two interference arms is transmitted in the forward direction, and the light in the silicon-based integrated magneto-optical waveguide of another one of the two interference arms is transmitted in the backward direction. The reciprocal phase difference between the two interference arms is an odd multiple of $\pi/2$; and the length of the silicon-based integrated magneto-optical waveguide is designed to make the non-reciprocal phase difference to be $\pi/2$ between the two interference arms.

The silicon-based integrated Mach-Zehnder interference structure further comprises a light splitting part, a light combining part, four ports, and two edges. The light splitting part and the light combining part, respectively, comprises two integrated 3 dB couplers. Two of the four ports are disposed at one edge and the remaining two ports are disposed at another edge. The two ports at one edge are respectively used as the input port and the receiving port of the silicon-based integrated magneto-optical circulator. One of the two ports at another edge isolated from the input port is suspended, and the remaining port at another edge is used as the emission port of the silicon-based integrated magneto-optical circulator.

In a class of this embodiment, the silicon-based integrated micro-ring structure comprises two silicon-based integrated straight waveguides and a silicon-based integrated ring optical waveguide. The two silicon-based integrated straight waveguides are disposed parallel to each other, and the silicon-based integrated ring optical waveguide are disposed between the two parallel silicon-based integrated straight waveguides. The silicon-based integrated ring optical waveguide is circular or racetrack-shaped. The silicon-based integrated magneto-optical waveguides are disposed in the silicon-based integrated ring waveguide.

The silicon-based integrated micro-ring structure further comprises four parts and two edges, in which two ports are disposed at one edge and the remaining two ports are disposed at another edge. The two ports at one edge are respectively used as the input port of the silicon-based integrated magneto-optical circulator and the emission port of the silicon-based integrated magneto-optical circulator. One of the two ports at another edge disposed in the same silicon-based integrated straight waveguide as the emission port of the silicon-based integrated magneto-optical circulator is used as the receiving port. The remaining port at another edge is suspended.

The laser is aligned and coupled to the input port of the silicon-based integrated magneto-optical circulator via an optical fiber, a grating coupler, or an edge coupler. The output power and output wavelength of the laser are determined according to the specific application environment, and the laser may be a discrete laser or waveguide integrated laser.

The optical detector is aligned and coupled to the receiving port of the silicon-based integrated magneto-optical circulator via the optical fiber, the grating coupler, or the edge coupler. The detection range and detection intensity of the optical detector are determined according to the laser source and the application environment. The optical detector may be a discrete optical detector or a waveguide integrated optical detector.

The laser antenna is aligned and coupled to the emission port of the silicon-based integrated magneto-optical circulator via the optical fiber, the grating coupler, or the edge coupler. The laser is configured to generate a laser light transmitting to the laser antenna via the silicon-based integrated magneto-optical circulator. The laser antenna is configured to collimate the laser light, compress the divergence angle of the laser light, and emit the compressed laser light. The laser antenna is also configured to receive the reflected light of a detected object. The laser antenna comprises an integrated optical waveguide, an optical waveguide array, or an optical grating.

When the lidar system is used, the input port of the silicon-based integrated magneto-optical circulator is configured to receive a detection signal generated by the laser. The detection signal enters the laser antenna through the silicon-based integrated magneto-optical circulator for single-channel emission, and is reflected by the detected object, thereby generating a reflected signal. The reflected signal is received by the laser antenna, returns to the silicon-based integrated magneto-optical circulator through the emission port, and then returns to the optical detector connected to the receiving port of the silicon-based integrated magneto-optical circulator from another channel, to run in a full-duplex mode.

Furthermore, to improve the transmission efficiency of the lidar system, the coupling optimization of each connection port is performed. At the same time, it is also necessary to further improve the figure of merit of the silicon-based integrated magneto-optical waveguides and increase the radius of the curved waveguide to minimize the optical loss. To eliminate the coupling loss, it is necessary to monolithically integrate the laser, the optical detector, the laser antenna, and the silicon-based integrated magneto-optical circulator on the same substrate at the same time to form an integrated and interconnected optical detection system. In addition, the laser antenna may be a phased array laser antenna, so as to obtain a larger detection range and achieve the purpose of spatial scanning.

The silicon-based integrated magneto-optical circulator in the disclosure adopts a silicon-based integrated Mach-Zehnder interference structure or a silicon-based integrated micro-ring structure, and combines reciprocal and non-reciprocal phase shifts to control the phases of the transceived signals to achieve a separation between the emitted and received signals through nonreciprocal phase shift effect. The lidar of the disclosure reduces the footprint and the cost of the overall system, improves the coupling efficiency of the reflected signal, avoids the problems of adjustment errors and low signal-to-noise ratio in discrete optical detection systems, and provides a better technical solution that integrates silicon-based integrated magneto-optical circulators, lasers, optical detectors and laser antennas on the same material substrate. It improves the performance of laser detection systems such as lidar, which is of great significance to reduce the volume, weight, and the cost of the system.

Figure 1:
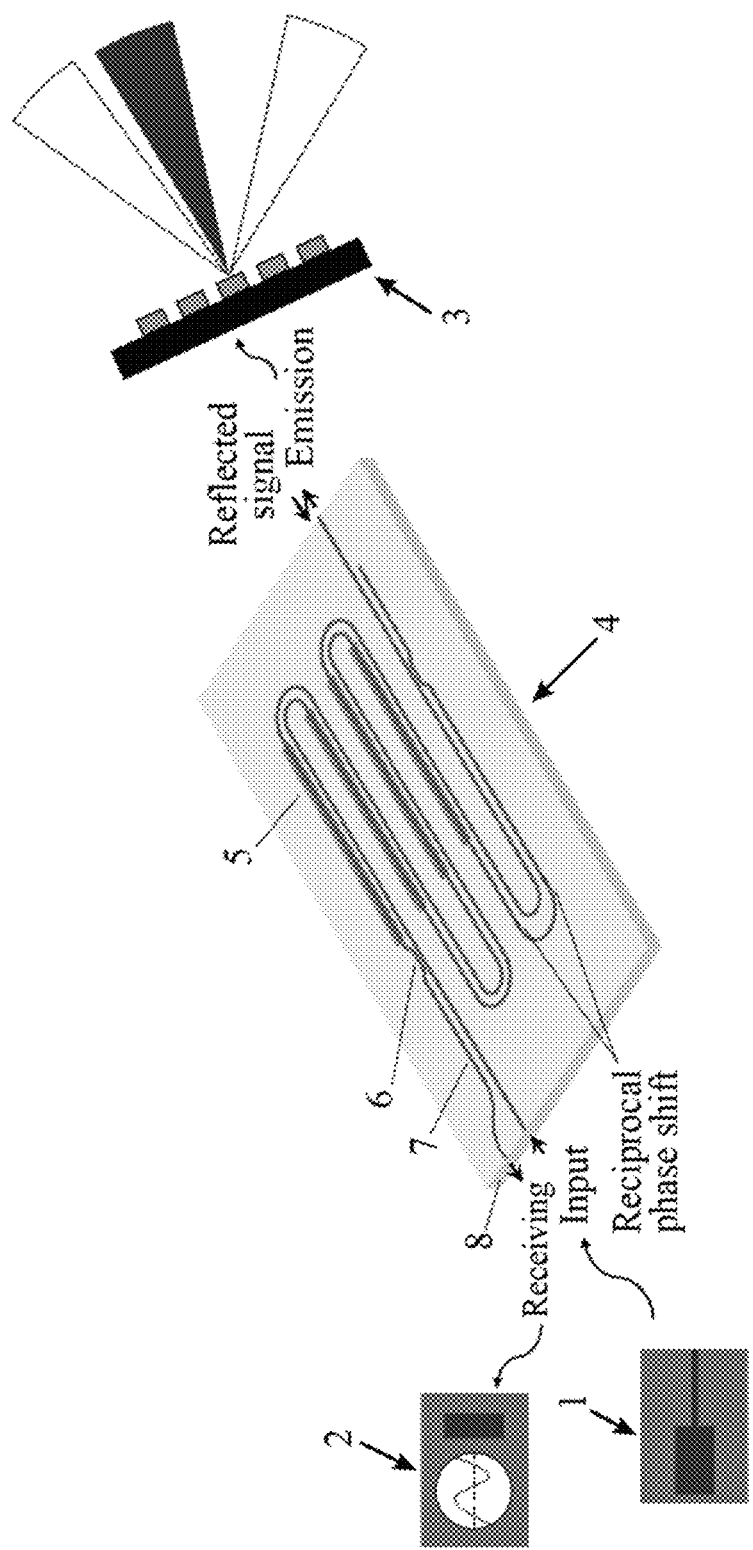
FIG. 1 is a schematic diagram illustrating a structure of a lidar system according to one embodiment of the disclosure.

In the drawings, the following reference numbers are used: 1. Laser; 2. Optical detector; 3. Laser antenna; 4. Silicon-based integrated magneto-optical circulator; 5. Silicon-based integrated magneto-optical waveguide; 6. 3 dB coupler; 7. Silicon-based optical waveguide; and 8. Silica substrate.

DETAILED DESCRIPTION

As mentioned in the background technique section, since in separate laser detection systems, the emission and the receiving ends usually use two independent optical ports for laser emission and detection, and such a system has problems such as adjustment errors and low signal-to-noise ratio. At the same time, the overall discrete systems are large in footprint, high in cost, and difficult to couple with optical components such as lasers, optical detectors, and laser antennas.

The lidar system of the disclosure improves the detection performance and reduces the volume, weight and cost of the system.

The technical solution adopted by the disclosure to solve the above-mentioned technical problems is to introduce a silicon-based integrated magneto-optical circulator into the traditional lidar system, and couple the silicon-based integrated magneto-optical circulator to a laser, an optical detector and a laser antenna respectively to form a new type of laser detection systems. The silicon-based integrated magneto-optical circulator is fabricated by photolithography and etching of the silicon-based integrated optical waveguide structure and deposition of magneto-optical materials.

To further illustrate the disclosure, embodiments detailing a lidar system are described below. It should be noted that the following embodiments are intended to describe and not to limit the disclosure.

A lidar system, in which a method of fabricating the silicon-based integrated magneto-optical circulator is as follows:

Step 1. photolithography and etching of semiconductor (including but not limited to silicon and silicon nitride) substrates are utilized to obtain single-mode integrated optical waveguide, as well as a Mach-Zehnder interference structure or a micro-ring structure, thereby combining reciprocal and non-reciprocal phase shift for phase control of output and received signals;

Step 2. a low-refractive-index cladding layer (including but not limited to silicon oxide materials) is grown by sputtering or other methods to cover the lidar device; the low-refractive-index cladding layer is also used as a barrier layer for the deposition of magneto-optical materials;

Step 3. at the upper surface of the silicon-based integrated magneto-optical waveguides, a window for depositing magneto-optical material is obtained by secondary photolithography, and the width of the window is larger than that of the silicon-based integrated magneto-optical waveguide; when an external magnetic field horizontal and perpendicular to the silicon-based integrated magneto-optical waveguide is applied, the silicon-based integrated magneto-optical material generates non-reciprocal phase shifts for the TM polarization mode in the waveguide; in the silicon-based integrated Mach-Zehnder interference structure, the length of the silicon-based integrated magneto-optical waveguide is determined so that the non-reciprocal phase shift between the forward and backward transmission light is $\pi/2$; then the reciprocal phase shift is determined so that the forward input signal and the backward received signal are coupled into different waveguides to separate the emitted and received signals;

Step 4. magneto-optical material (including but not limited to cerium-doped yttrium iron garnet) is grown (including but not limited to pulsed laser deposition technology and wafer bonding technology) in the windows.

A schematic diagram illustrating a structure of a lidar system is shown in FIG. 1. The silicon-based integrated magneto-optical circulator comprises the Mach-Zehnder interference structure with two 3 dB couplers 6. The laser and the optical detector are respectively coupled with the input port and the receiving port of the silicon-based integrated magneto-optical circulator. The laser antenna is coupled to the emission port of the silicon-based integrated magneto-optical circulator (including but not limited to edge coupling and grating coupling technology).

When the lidar system is used, the input port of the silicon-based integrated magneto-optical circulator is configured to receive a detection signal generated by the laser; the detection signal enters the laser antenna through the silicon-based integrated magneto-optical circulator for single-channel emission, and is reflected by the detected object. The reflected signal is received by the laser antenna, returns to the emission port to be re-coupled into the silicon-based integrated magneto-optical circulator, propagates to the receiving port along a path different from the emission optical path, and finally enters the optical detector. The silicon-based integrated magneto-optical circulator employs the optical non-reciprocity of magneto-optical materials to separate the forward and backward transmission light.

Figure 2:
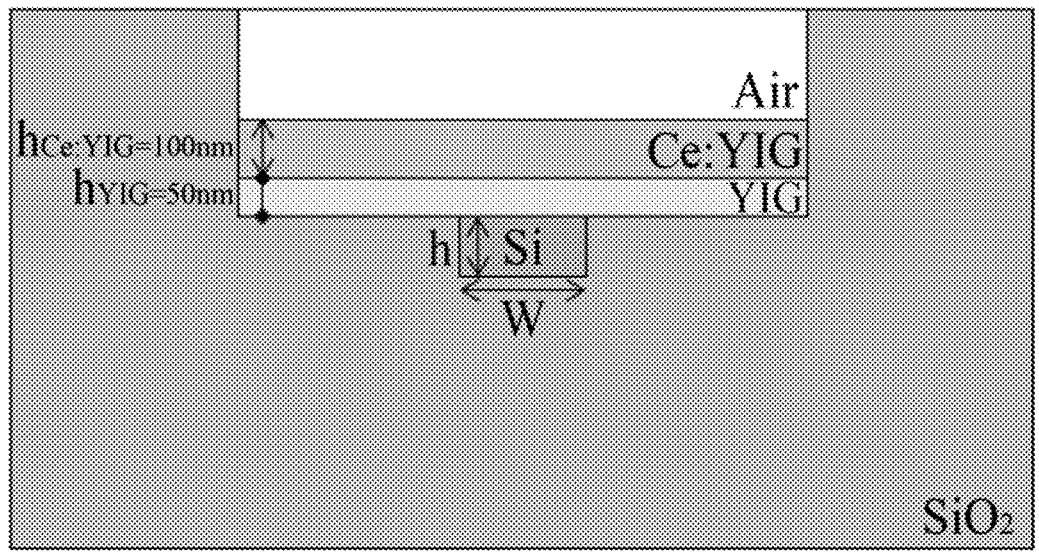
FIG. 2 is a schematic diagram of a cross-sectional structure of a silicon-based integrated magneto-optical waveguide according to one embodiment of the disclosure.

A schematic diagram of a cross-sectional structure of a silicon-based integrated magneto-optical waveguide is shown in FIG. 2. The waveguide core comprises a semiconductor material (including but not limited to silicon and silicon nitride materials). In the example, the waveguide core comprises a silicon waveguide with a thickness of 220 nm and a width of 500 nm, or a silicon nitride waveguide with a thickness of 400 nm and a width of 1000 nm. The low refractive index cladding comprises silicon dioxide ($SiO_2$). In magneto-optical waveguide, the thickness of the upper cladding yttrium iron garnet (YIG) and cerium-doped yttrium iron garnet (Ce:YIG) are 50 nm and 100 nm, respectively.

Figure 3:
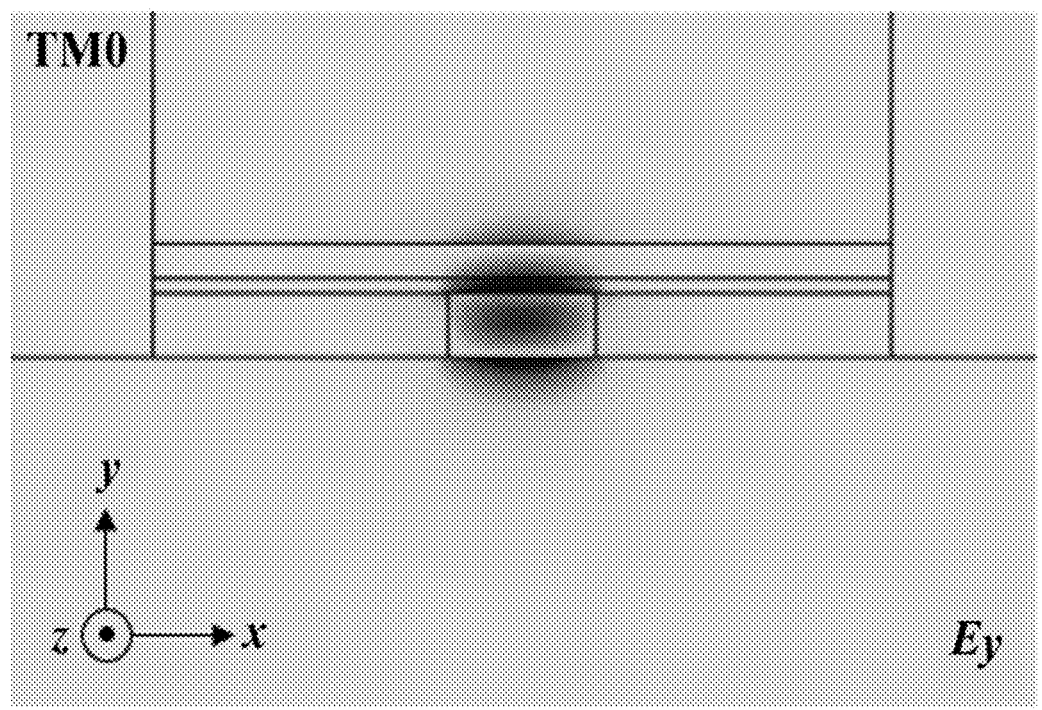
FIG. 3 is a schematic diagram of the y-direction component of the electric field of the $TM_0$ mode of the cross-section of a silicon-based integrated magneto-optical waveguide according to one embodiment of the disclosure.

In the silicon-based integrated optical waveguide, the propagation light is limited to be one transmission mode which is the fundamental TM mode. A schematic diagram of the y-direction component of the electric field of the TM0 mode of the cross-section of a silicon-based integrated magneto-optical waveguide is shown in FIG. 3.

Figure 4:
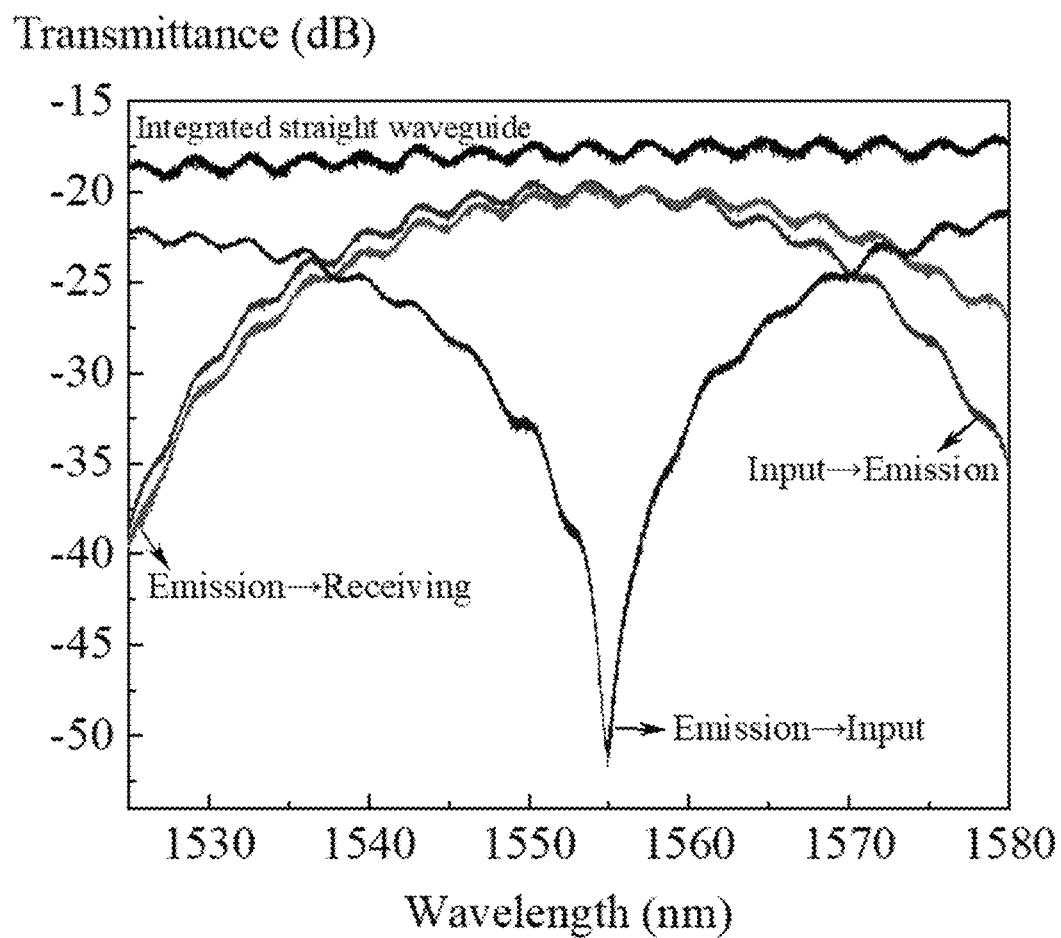
FIG. 4 is a schematic diagram of transmission spectra of detection signals and reflected signals according to one embodiment of the disclosure.

A schematic diagram of transmission spectra of detection signals and reflected signals is shown in FIG. 4. During testing, an external magnetic field was applied in the horizontal direction perpendicular to the magneto-optical waveguide in the silicon-based integrated magneto-optical circulator to make the magneto-optical film magnetically saturated in the in-plane direction. The laser signal at the input port is a continuous spectrum with the wavelength from 1510 nm to 1620 nm, and the optical power is set to be 8 dBm. The laser signal is coupled into the silicon-based integrated magneto-optical circulator by means of edge coupling through an optical fiber as the detection signal. At the emission port, the light is re-coupled into another optical fiber connected to the optical detector for detection. The detection data is the wavelength and the corresponding light intensity, and the wavelength detection interval is set to be 2 pm.

The same laser and optical detector are used to test the two signals from the emission port to the input port and from the emission port to the receiving port to simulate the situation when the lidar system receives the reflected signal. It can be observed from the transmission spectra that the signal transmission from the input port to the emission port and from the emission port back to the receiving port is basically the same after removing the edge coupling loss. Compared with the transmission intensity of the silicon-based integrated straight waveguide, the insertion loss of the integrated magneto-optical circulator is 2.3 dB. The signal intensity from the emission port back to the input port is suppressed by an additional 32 dB.

It will be obvious to those skilled in the art that changes and modifications may be made, and therefore, the aim in the appended claims is to cover all such changes and modifications.

What is claimed is:

1. A lidar system, comprising:

a laser;

an optical detector;

a laser antenna; and a silicon-based integrated magneto-optical circulator comprising an input port, a receiving port, and an emission port;

wherein:

the silicon-based integrated magneto-optical circulator comprises a silicon-based integrated Mach-Zehnder interference structure or a silicon-based integrated micro-ring structure, and a plurality of silicon-based integrated magneto-optical waveguides;

the laser is aligned and coupled to the input port of the silicon-based integrated magneto-optical circulator via an optical fiber, a grating coupler, or an edge coupler;

the optical detector is aligned and coupled to the receiving port of the silicon-based integrated magneto-optical circulator via the optical fiber, the grating coupler, or the edge coupler;

the laser antenna is aligned and coupled to the emission port of the silicon-based integrated magneto-optical circulator via the optical fiber, the grating coupler, or the edge coupler; the laser is configured to generate a laser light transmitting to the laser antenna via the silicon-based integrated magneto-optical circulator; the laser antenna is configured to collimate the laser light, compress the divergence angle of the laser light, and emits the compressed laser light; moreover, the laser antenna is also configured to receive the reflected light of a detected object;

when the lidar system is used, the input port of the silicon-based integrated magneto-optical circulator is configured to receive a detection signal generated by the laser; the detection signal enters the laser antenna through the silicon-based integrated magneto-optical circulator for single-channel emission, and is reflected by the detected object, thereby generating a reflected signal; the reflected signal is received by the laser antenna, returns to the silicon-based integrated magneto-optical circulator through the emission port, and then returns to the optical detector connected to the receiving port of the silicon-based integrated magneto-optical circulator from another channel, to run in a full-duplex mode; and the silicon-based integrated Mach-Zehnder interference structure comprises two interference arms, and the plurality of silicon-based integrated magneto-optical waveguides comprise 180° curved waveguides to steer a light to an opposite direction;

a reciprocal phase difference between the two interference arms is an odd multiple of $\pi/2$; and a non-reciprocal phase difference between the two interference arms is set to be $\pi/2$ by configuring the length of each silicon-based integrated magneto-optical waveguide;

one of the two interference arms is adapted to unidirectionally transmit light in a forward direction, and the other one of the two interference arms is adapted to unidirectionally transmit light in a backward direction; and when in use, the light transmitted in the forward direction and the light transmitted in the backward direction are separated from each other.

2. The lidar system of claim 1, wherein:

the silicon-based integrated Mach-Zehnder interference structure further comprises a light splitting part, a light combining part, four ports, and two edges; the light splitting part and the light combining part, respectively, comprises two integrated 3 dB couplers; two of the four ports are disposed at one edge and the remaining two ports are disposed at another edge; the two ports at one edge are respectively used as the input port and the receiving port of the silicon-based integrated magneto-optical circulator; one of the two ports at another edge isolated from the input port is suspended, and the remaining port is used as the emission port of the silicon-based integrated magneto-optical circulator.

3. The lidar system of claim 1, wherein:

the silicon-based integrated micro-ring structure comprises two silicon-based integrated straight waveguides and a silicon-based integrated ring optical waveguide; the two silicon-based integrated straight waveguides are disposed parallel to each other, and the silicon-based integrated ring optical waveguide is disposed between the two silicon-based integrated straight waveguides; the silicon-based integrated ring optical waveguide is circular or racetrack-shaped; the silicon-based integrated magneto-optical waveguides are disposed in the silicon-based integrated ring waveguide; and the silicon-based integrated micro-ring structure comprises four ports and two edges, in which two ports are disposed at one edge and the remaining two ports are disposed at another edge; the two ports on one edge are respectively used as the input port of the silicon-based integrated magneto-optical circulator and the emission port of the silicon-based integrated magneto-optical circulator; one of the two ports at another edge disposed in the same silicon-based integrated straight waveguide as the emission port of the silicon-based integrated magneto-optical circulator is used as the receiving port; and the remaining port at another edge is suspended.

4. The lidar system of claim 1, wherein the laser antenna is a phased array laser antenna.

* * * * *